3,057,776
SCHISTOSOMIASIS TREATMENT
Franklin W. Short and Edward F. Elslager, St. Clair Shores, Mich., assignors to Parke, Davis & Company, Detroit, Mich., a corporation of Michigan
No Drawing. Filed Mar. 24, 1959, Ser. No. 801,444
4 Claims. (Cl. 167—55)

The present invention relates to therapeutic compositions useful in the treatment of schistosomiasis and to methods for the treatment of schistosomiasis by the use of these compositions.

More particularly, the present invention relates to antischistosomal compositions which furnish as an active ingredient pararosaniline or a non-toxic salt thereof and to methods for the use of such anti-schistosomal compositions.

Pararosaniline compounds intended for use in the compositions of this invention can be represented by the structural formula

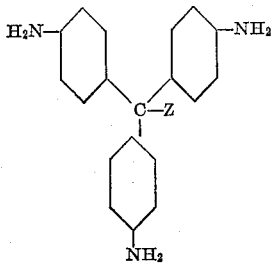

where Z is a non-toxic anion of a labile covalent group. When Z is a hydroxyl group, the compound is pararosaniline itself. Salts of the foregoing formula comprehended for use in the compositions and methods of this invention include the hydrochloride (sometimes also known as the chloride or as parafuchsin), hydrobromide, hydriodide, acetate, sulfate, palmitate, stearate, succinate, tartrate, salicylate, hydroxynaphthoate, 2-hydroxy-6-naphthalenesulfonate, pamoate (salt with 2,2′-dihydroxy-1,1′-dinaphthylmethane-3,3′-dicarboxylic acid), salt with 1,5-naphthalenedisulfonic acid, and salts formed with a variety of other inorganic and organic acids. The specific pararosaniline derivative formulated into the compositions of this invention can be either a salt, as of the general type indicated hereinbefore, or a derivative which affords such a salt in its normal method of use. An example of such a derivative is the methyl ether of pararosaniline which, in consequence of the labile covalent bond binding the methoxyl group to the central carbon atom, is rapidly converted to an ionic salt when it is brought into contact with the normally acidic contents of the stomach.

The dosages and relative activities of pararosaniline compounds of the foregoing formula are conveniently expressed in terms of pararosaniline cation equivalent, which is defined as the quantity of pararosaniline cation or tris(p-aminophenyl)carbonium cation which corresponds stoichiometrically with any given quantity of a pararosaniline derivative.

Schistosomiasis is a disease of great medical and economic importance in many areas of the world, particularly in tropical and semi-tropical climates. The great number and variety of therapeutic agents which have been proposed for the treatment of schistosomiasis reflect the difficulties which have been encountered in developing satisfactory means for the treatment and control of this disease. The development of satisfactory methods for the treatment and control of schistosomiasis is rendered more difficult by its prevalence in areas where adequate medical care is lacking and economic standards are low. Moreover, the disease is persistent and maintained at an epidemic level by relapse and reinfection.

Of the various agents that have been proposed for the treatment of schistosomiasis, the ones which presently have the most widespread use are compounds of trivalent and pentavalent antimony and certain derivatives of thioxanthone.

Representative of the antimony compounds is tartar emetic or antimony potassium tartrate. In some instances, satisfactory treatment of schistosomiasis has been obtained with tartar emetic. However, this compound must commonly be administered by intravenous injection and its use is associated with a high incidence of toxic side-effects such as gastrointestinal upset, cough, bronchitis, cardiac irregularities, neuralgia and vascular collapse. There is evidence of greatly increased toxicity in patients with liver and kidney disease. Partly because of the difficulty of maintaining an adequate course of treatment, relapses following the use of tartar emetic are of frequent occurrence. These and similar disadvantages are associated with the use of antimonials generally and it has been reported that intolerance to these drugs increases upon prolonged administration.

Representative of the thioxanthones that have been proposed for the treatment of schistosomiasis is 1-diethylaminoethylamino - 4 - methylthioxanthone hydrochloride. This compound is effective against some schistosomes, is orally active and has been reported to produce marked clinical improvement in many patients suffering with schistosomiasis. However, its use is associated with toxic side-effects on the gastrointestinal and nervous systems and a high incidence of relapses following the course of treatment.

One of the objects of the present invention is to provide compositions for the treatment of schistosomiasis which have a higher degree of useful therapeutic activity with relative freedom from toxic side-effects than other compositions presently in use.

Another object of this invention is to provide compositions for the treatment of schistosomiasis which are therapeutically effective in cases where the presently-accepted medicaments fail to produce clinically-satisfactory results.

A further object of this invention is to provide compositions for the treatment of schistosomiasis which permit the eradication of disease-producing parasites from the body with a minimum incidence of subsequent relapse.

Still another object of this invention is to provide compositions for the treatment of schistosomiasis which act prophylactically against the development of the disease, such compositions being of particular value in circumstances where repeated reinfection of large segments of the population is likely to occur.

Still a further object of this invention is to provide pararosaniline salts having therapeutic properties superior to those of the pararosaniline salts known in the prior art.

An aditional object of this invention is to provide methods for the treatment of schistosomiasis by the use of the compositions disclosed herein.

In accordance with the invention, these, as well as other objects which will appear hereinafter, are realized by the production and use of compositions affording pararosaniline or a non-toxic salt thereof, alone or in combination with other active ingredients.

The compositions and methods of this invention are characterized by their high degree of effectiveness against schistosomes, by their oral activity for such purpose, by their relative freedom from undesirable side-effects, and by their ease of administration and low cost, whereby they can be employed for mass control of the disease.

Pararosaniline and various of its salts have been known in the dye industry for many years. According to the present invention, it has been found that the employment of compositions containing such pararosaniline compounds affords a high degree of effectiveness in the treatment of schistosomiasis without the combinations of disadvantages that have rendered the prior art methods such as those involving the use of the antimony compounds and the thioxanthones of such limited utility in the treatment of this disease. Apart from, and in addition to, the beneficial results which this invention affords, the development of the invention is deemed noteworthy for two reasons: first, in that the commercial availability of pararosaniline and the unsolved problem of schistosomiasis have co-existed for many decades without the result of this invention being attained, in spite of the fact that pararosaniline was known to be active against other classes of parasites in in vitro studies and in laboratory animals, and, second, in that the highly specific activity of pararosaniline compositions against schistosomiasis results although numerous other dyes of related structure, including substances as closely related as rosaniline, have no useful degree of curative activity against schistosomiasis. Consequently, the development of a useful antischistosomal agent in the pararosaniline compositions of this invention is entirely unexpected from the teachings of the prior art.

Pararosaniline salts of a great variety can be prepared by methods described in the literature. They can be conveniently obtained by the reaction of pararosaniline with an organic or inorganic acid. Those pararosaniline salts which are relatively insoluble can also be obtained by the reaction of a soluble pararosaniline salt with a soluble salt of an organic or inorganic acid.

In one of the preferred embodiments of this invention, novel pararosaniline salts are provided which are particularly advantageous for use in anti-schistosomal compositions. Whereas simple pararosaniline salts such as the hydrochloride do not exhibit the high degree of toxicity shown by prior art compounds used in the treatment of schistosomiasis, they nevertheless exhibit a certain degree of gastrointestinal irritation including in some subjects vomiting, diarrhea and loss of appetite. These incidental effects of pararosaniline therapy are substantially reduced with certain novel salts comprising the tris(p-aminophenyl)carbonium cation (pararosaniline cation) and an anion of pamoic acid which is 2,2'-dihydroxy-1,1'-dinaphthylmethane-3,3'-dicarboxylic acid. Such salts include bispararosaniline pamoate, a salt comprising two moles of the pararosaniline cation to one mole of the divalent pamoate anion, and pararosaniline acid pamoate, a salt comprising one mole of the pararosaniline cation to one mole of the monovalent acid pamoate anion. These salts produce an anti-schistosomal effect upon oral administration with a much lower incidence of gastrointestinal irritation and toxicity. Moreover, they display reduced staining properties when compared with simple pararosaniline salts such as the hydrochloride.

The pararosaniline salts of pamoic acid can be formed by reaction of a soluble salt of pararosaniline with a soluble salt of pamoic acid, suitably in an unreactive medium such as water or an aqueous alkanol. The desired pamoate salt either precipitates from the reaction mixture, or can be obtained by concentration of the mixture, or by dilution with water or with a non-polar solvent.

In another method for the production of pararosaniline salts of pamoic acid, pararosaniline is treated with pamoic acid, suitably in an unreactive, approximately neutral solvent such as dimethylformamide or an aqueous alkanol.

According to the present invention, schistosomacidal compositions are produced by formulating compositions furnishing pararosaniline or a non-toxic salt thereof. Such compositions are constituted in dosage unit form with pharmaceutical carriers or diluents. In view of the oral activity of pararosaniline and its non-toxic salts, dosage unit forms for oral administration are particularly suitable. For this purpose, the pararosaniline compound can be incorporated into tablets, powders, capsules, solutions, suspensions and similar forms. The medicament can be incorporated with pharmaceutically-acceptable solid or liquid diluents. Solid carriers and diluents are particularly suitable for use and include sugars such as lactose and sucrose; cellulose derivatives such as sodium carboxymethyl cellulose, ethyl cellulose, methyl cellulose and cellulose acetate phthalate; gelatin (including hard and soft gelatin capsules); talc, corn starch, stearic acid and magnesium stearate. Liquid carriers and diluents suitable for use include vegetable oils such as peanut oil, cottonseed oil, sesame oil, olive oil, corn oil, and oil of theobroma; polyethylene glycol; propylene glycol; glycerin; sorbitol; ethanol and water. Suitable preservatives and flavoring agents can also be incorporated in such compositions. In the production of dosage forms such as tablets, the use of an enteric coating or a sugar coating is also useful in minimizing a tendency toward nausea or staining. If administration by a parenteral route is desired, the medicament can also be prepared in solution or suspension in ampoule form by admixture with a liquid diluent. Other therapeutic agents can also be incorporated with a pararosaniline compound in these compositions.

The percentage of the pararosaniline compound in the compositions can be varied within wide limits, but, for practical purposes, is preferably present in a concentration of at least 5%. The most satisfactory compositions are those in which a much higher proportion of the pararosaniline compound is present.

According to the methods of this invention, the aforementioned compositions are administered in dosage unit form for the treatment and prophylaxis of schistosomiasis. The compositions are commonly administered orally, with the dose adjusted to the needs and tolerances of the individual patient. The indicated total daily dose is within the range of approximately 0.5 to 4.0 g. (calculated as pararosaniline cation equivalent) optionally in divided portions. Within the indicated range, the dose is adjusted according to the size and age of the patient and the patient's response to the medication. For example, in the case of a child subject to gastrointestinal irritation, the proper dose would commonly be found near the lower limit of the indicated range whereas, in the case of an adult experiencing no side-effects, the proper dose would commonly be found near the upper limit of the indicated range. Treatment is continued for a period of from several days up to a few weeks or until the desired response is obtained.

In the preparation of dosage unit forms such as tablets and capsules the quantity of medicament furnished by each individual tablet or capsule is selected such that the proper total daily dose can be reached by administering either one or a reasonable number of the tablets or capsules. For convenience in manufacturing and ease of administration, it is preferable that such dosage forms contain at least 50 mg. and up to 500 mg. of pararosaniline compound (calculated as pararosaniline cation equivalent) per unit.

As previously indicated, the compositions of the invention are orally effective in the treatment and prophylaxis of schistosomiasis. They are active against immature as well as mature schistosomes whereas prior art materials such as tartar emetic and 1-diethylaminoethylamino-4-methylthioxanthone hydrochloride have been reported ineffective against immature worms. Moreover, the compositions of this invention are effective against other trematodes. They are useful in the treatment of paragonimiasis, effecting a strong inhibition in the production of ova in the latter disease.

The invention is illustrated, but not limited, by the following examples:

*Example 1*

A batch of hydrated pararosaniline hydrochloride is prepared for tableting by treating it with 1% of mineral oil to minimize dust formation. This product (1200 g.) containing about 5.7% of water and 1% of mineral oil is intimately mixed with 850 g. of sifted corn starch and 550 g. of sugar containing 3% starch. This mixture is granulated with a 10% w./w. solution of 68 g. of flake gelatin in distilled water. The granulation is dried and reduced. Sifted talc (75 g.), sifted corn starch (370 g.), and magnesium stearate (7 g.) are blended in and the mixture is processed through a tableting machine to provide about 9500 tablets each containing approximately 100 mg. of pararosaniline cation equivalent. If desired, these tablets can be given an enteric coating.

*Example 2*

A batch of hydrated bispararosaniline pamoate is prepared for tableting by treating it with 1% of mineral oil in order to minimize dust formation. This product (1828 g.) containing 7.5% of water and 1% of mineral oil is blended with 800 g. of sifted corn starch and the mixture wet granulated with a 10% w./w. solution of 176 g. of sifted corn starch in distilled water. After the granulation has been dried and reduced, there are blended in 80 g. of sifted talc, 280 g. of sifted corn starch and 14 g. of magnesium stearate. The mixture is then compressed on a tableting machine to provide about 9500 tablets, each containing approximately 100 mg. of pararosaniline cation equivalent. If desired, a light sugar coating is applied.

A quantity of pararosaniline acid pamoate affording an equal amount of pararosaniline cation can be substituted for the bispararosaniline pamoate in the foregoing procedure.

*Example 3*

A batch of pararosaniline salicylate assaying 1.6% of water is constituted into dosage units by encapsulation in 300 mg. portions into hard gelatin capsules. The yield from 600 g. of this lot of hydrated pararosaniline salicylate is about 1950 capsules, each containing approximately 200 mg. of pararosaniline cation equivalent.

*Example 4*

A mixture of 1060 g. of pararosaniline and 1440 g. of lactose is blended and filled into hard gelatin capsules so that each capsule contains 250 mg. of the mixture, equivalent to 100 mg. of pararosaniline cation equivalent. The yield is approximately 9800 capsules.

*Example 5*

An intimate mixture of 355 g. of bispararosaniline pamoate (assaying 5.9% of water) and 145 g. of lactose is prepared and filled into hard gelatin capsules so that each capsule contains 500 mg. of the mixture. The yield is about 975 capsules, each containing approximately 200 mg. pararosaniline cation equivalent.

*Example 6*

The following are illustrations of methods by which novel pararosaniline salts are produced.

A mixture of 235 g. of pararosaniline hydrochloride (containing 1.8% of water) and 160 g. of disodium pamoate monohydrate in 3 liters of methanol is heated and stirred for 3 hours and then filtered slowly with vigorous stirring into 15 liters of water. The insoluble product is washed with water and dried in vacuo at 50–60° C. The product obtained in this manner is hydrated bispararosaniline pamoate, a salt comprising two moles of the tris(p-aminophenyl)carbonium cation (pararosaniline cation) to one mole of the divalent pamoate anion; M.P. about 220–225° C.

A filtered solution of 1.5 g. of pararosaniline hydrochloride in 200 ml. of water heated to the boiling point is added to a hot, filtered solution of 8.0 g. of disodium pamoate monohydrate in 100 ml. of water. The gummy product which precipitates solidifies on cooling and is collected on a filter. It is resuspended in water, again collected and then dried in vacuo at 50° C. This compound is hydrated bispararosaniline pamoate, substantially identical with the product described above.

To a hot, filtered solution of 3.88 g. of pamoic acid in 150 ml. of N,N-dimethylformamide is gradually added a solution of 6.10 g. of pararosaniline in 100 ml. of hot N,N-dimethylformamide. The resulting deeply-colored solution is heated for one hour at 90–100° C. and then poured with stirring into 1 liter of cold water. The insoluble product is collected on a filter, washed with water and dried in vacuo. This compound is dark-green bispararosaniline pamoate, substantially identical with the product described above.

To a hot, filtered solution of 3.88 g. of pamoic acid in 125 ml. of N,N-dimethylformamide is added a solution of 3.05 g. of pararosaniline in 50 ml. of hot N,N-dimethylformamide. A dark-red solution which results is heated for one hour at 90–100° C. and then poured with vigorous stirring into 2 liters of cold water. The reddish-brown product is collected on a filter, washed well with water and dried in vacuo at 45° C. Purification by recrystallization from methanol affords pararosaniline acid pamoate, a salt comprising one mole of the tris(p-aminophenyl)carbonium cation (pararosaniline cation) to one mole of the monovalent acid pamoate anion; M.P. 205–210° C.

A hot, filtered solution of 32.4 g. of pararosaniline hydrochloride in 500 ml. of water is added to a hot, filtered solution of 16.0 g. of sodium salicylate in 100 ml. of water. The gummy product is collected and refrigerated until it turns solid. It is then triturated with water, collected on a filter and dried in vacuo over calcium chloride at room temperature and then at 50° C. This compound is hydrated pararosaniline salicylate, a salt comprising one mole of the tris(p-aminophenyl)carbonium cation to one mole of the salicylate anion.

A solution of 7.9 g. of phenolphthalein in 150 ml. of water containing 2.0 g. of sodium hydroxide is added to a solution of 16.2 g. of pararosaniline hydrochloride in 500 ml. of methanol. The solution is filtered and the filtrate is added slowly with vigorous stirring to 2 liters of water. The insoluble product is collected on a filter and dried. It is a hydrated salt comprising 2 moles of the tris(p-aminophenyl)carbonium cation to one mole of the phenolphthalein anion. The compound melts over a range beginning at about 200° C.

A solution of 7.2 g. of 5,5'-methylenedisalicylic acid in 150 ml. of water containing 2.0 g. of sodium hydroxide is added to a solution of 16.2 g. of pararosaniline hydrochloride in 500 ml. of warm methanol. The product which crystallizes from the solution upon standing and cooling is collected on a filter. It is a hydrated salt comprising two moles of the tris(p-aminophenyl)carbonium cation to one mole of the 5,5'-methylenedisalicylate anion. This compound melts over a range beginning at about 230° C.

A solution of 9.4 g. of 3-hydroxy-2-naphthoic acid in 100 ml. of water containing 2.0 g. of sodium hydroxide is added to a solution of 16.2 g. of pararosaniline hydrochloride in 600 ml. of warm methanol. The resulting solution is added slowly with stirring to 2.5 liters of cold water. The greenish solid is collected on a filter, washed with water and dried at 45° C. in vacuo. This compound is a hydrated salt comprising one mole of the tris(p-aminophenyl)carbonium cation to one mole of the 3-hydroxy-2-naphthoate anion.

We claim:

1. A method for the treatment of schistosomiasis which comprises internally administering a composition furnishing a member of the class consisting of pararosaniline and non-toxic salts thereof to a living human being.

2. A method for the treatment of schistosomiasis which comprises administering pararosaniline hydrochloride to a living human being in a daily oral dose of from 500 milligrams to 4 grams of pararosaniline cation equivalent.

3. A method for the treatment of schistosomiasis which comprises administering bispararosaniline pamoate to a living human being in a daily oral dose of from 500 milligrams to 4 grams of pararosaniline cation equivalent.

4. A method for the treatment of schistosomiasis which comprises administering pararosaniline acid pamoate to a living human being in a daily oral dose of from 500 milligrams to 4 grams of pararosaniline cation equivalent.

References Cited in the file of this patent

UNITED STATES PATENTS

| 2,816,900 | Herrick et al. | Dec. 17, 1957 |
| 2,829,149 | Chalkley | Apr. 1, 1958 |
| 2,868,692 | Bach et al. | Jan. 13, 1959 |
| 2,890,982 | Natt | June 16, 1959 |

OTHER REFERENCES

Jenkins et al.: John Wiley and Sons Inc., 1957, page 189.

U.S. Dispensatory, 25th Ed., 1955, Lippincott Co., Phila., Pa., page 591.